(12) United States Patent
Ohnishi et al.

(10) Patent No.: US 7,364,794 B2
(45) Date of Patent: Apr. 29, 2008

(54) OXIDATION RESISTANT CARBON FIBER REINFORCED CARBON COMPOSITE MATERIAL AND PROCESS FOR PRODUCING THE SAME

(75) Inventors: Yumi Ohnishi, Kagawa (JP); Toshiaki Sogabe, Kagawa (JP)

(73) Assignee: Toyo Tanso Co., Ltd., Osaka-shi (JP)

( * ) Notice: Subject to any disclaimer, the term of this patent is extended or adjusted under 35 U.S.C. 154(b) by 367 days.

(21) Appl. No.: 10/503,597

(22) PCT Filed: Feb. 14, 2003

(86) PCT No.: PCT/JP03/01584

§ 371 (c)(1),
(2), (4) Date: Aug. 13, 2004

(87) PCT Pub. No.: WO03/068707

PCT Pub. Date: Aug. 21, 2003

(65) Prior Publication Data

US 2005/0142346 A1   Jun. 30, 2005

(30) Foreign Application Priority Data

Feb. 14, 2002  (JP)  .............................. 2002-36669

(51) Int. Cl.
*B32B 9/00* (2006.01)
(52) U.S. Cl. .................. 428/408; 264/29.1; 428/293.1; 428/293.7

(58) Field of Classification Search ................ 428/408, 428/367, 293.1, 293.4, 293.7; 442/179; 188/251 R; 264/29.1; 501/95.2
See application file for complete search history.

(56) References Cited

U.S. PATENT DOCUMENTS

| | | | | |
|---|---|---|---|---|
| 3,261,697 A | * | 7/1966 | Parker et al. | 501/99 |
| 3,814,642 A | * | 6/1974 | Araki et al. | 156/60 |
| 3,943,213 A | * | 3/1976 | Whittaker et al. | 423/448 |
| 3,956,436 A | * | 5/1976 | Honda et al. | 423/448 |
| 4,119,189 A | * | 10/1978 | Ehrenreich | 192/107 M |
| 5,169,718 A | * | 12/1992 | Miura et al. | 428/408 |

FOREIGN PATENT DOCUMENTS

| | | |
|---|---|---|
| JP | 61-26563 | 2/1986 |
| JP | 3-250032 | 11/1991 |
| JP | 4-2660 | 1/1992 |
| JP | 4-214073 | 8/1992 |
| JP | 6-48833 | 2/1994 |

* cited by examiner

*Primary Examiner*—N. Edwards
(74) *Attorney, Agent, or Firm*—Oblon, Spivak, McClelland, Maier & Neustadt, P.C.

(57) ABSTRACT

An oxidation resistant carbon fiber reinforced carbon composite material comprises a matrix and 20 volume % or more of carbon fibers, and is characterized in that: the matrix contains ceramic powder that includes boron carbide powder having an average particle diameter of 5 μm or less; and an amount of the ceramic powder is 32 volume % or more based on volume of the carbon fibers.

13 Claims, 8 Drawing Sheets

FIG. 1(a)

| | CARBON FIBER (CF) | | |
|---|---|---|---|
| | TYPE | VOLUME FRACTION TO TOTAL MATERIALS (%) | |
| EXAMPLE 1 | FINE-WOVEN CLOTH | 35 | |
| EXAMPLE 2 | FINE-WOVEN CLOTH | 37 | |
| EXAMPLE 3 | FINE-WOVEN CLOTH | 40 | |
| EXAMPLE 4 | FINE-WOVEN CLOTH | 23 | |
| EXAMPLE 5 | FINE-WOVEN CLOTH | 25 | |
| EXAMPLE 6 | FINE-WOVEN CLOTH | 20 | |
| EXAMPLE 7 | FINE-WOVEN CLOTH | 30 | 40 |
| | SHORT CARBON FIBER (30 $\mu$m) | 10 | |
| EXAMPLE 8 | FINE-WOVEN CLOTH | 35 | 40 |
| | SHORT CARBON FIBER (1000 $\mu$m) | 5 | |
| EXAMPLE 9 | FINE-WOVEN CLOTH | 31 | |
| EXAMPLE 10 | FINE-WOVEN CLOTH | 25 | 32 |
| | SHORT CARBON FIBER (30 $\mu$m) | 7 | |
| EXAMPLE 11 | FINE-WOVEN CLOTH | 25 | 30 |
| | SHORT CARBON FIBER (1000 $\mu$m) | 5 | |
| EXAMPLE 12 | FINE-WOVEN CLOTH | 29 | |
| EXAMPLE 13 | PLAIN-WOVEN CLOTH | 30 | |
| EXAMPLE 14 | PLAIN-WOVEN CLOTH | 35 | |
| EXAMPLE 15 | PLAIN-WOVEN CLOTH | 30 | |
| EXAMPLE 16 | PLAIN-WOVEN CLOTH | 30 | |
| EXAMPLE 17 | ONE-DIMENSIONAL SHEET | 35 | |
| EXAMPLE 18 | ONE-DIMENSIONAL SHEET | 32 | |
| EXAMPLE 19 | FINE-WOVEN CLOTH | 46 | |
| EXAMPLE 20 | FINE-WOVEN CLOTH | 35 | |
| EXAMPLE 21 | PLAIN-WOVEN CLOTH | 30 | |
| EXAMPLE 22 | FINE-WOVEN CLOTH | 44 | |
| COMP.EX. 1 | FINE-WOVEN CLOTH | 37 | |
| COMP.EX. 2 | FINE-WOVEN CLOTH | 37 | |
| COMP.EX. 3 | FINE-WOVEN CLOTH | 34 | |
| COMP.EX. 4 | PLAIN-WOVEN CLOTH | 30 | |
| COMP.EX. 5 | FINE-WOVEN CLOTH | 45 | |
| COMP.EX. 6 | PLAIN-WOVEN CLOTH | 45 | |
| COMP.EX. 7 | FINE-WOVEN CLOTH | 53 | |

FIG. 1(b)

| | MATRIX PRECURSOR | | | | | | VOLUME FRACTION OF CERAMIC POWDER IN MATRIX (%) | VISCOSITY OF SLURRY (mPa·s) |
|---|---|---|---|---|---|---|---|---|
| | CARBON PRECURSOR | | | CERAMIC POWDER | | | | |
| | TYPE | WEIGHT RATIO TO CF (based upon CF being 1) | VOLUME FRACTION TO CF (%) | TYPE | WEIGHT RATIO TO CF (based upon CF being 100) | VOLUME FRACTION TO CF (%) | | |
| EXAMPLE 1 | RESOL PHENOLIC RESIN | 1.1 | 66 | BORON CARBIDE 3 μm | 96 | 69 | 51 | — |
| EXAMPLE 2 | RESOL PHENOLIC RESIN | 1.1 | 66 | BORON CARBIDE 1 μm | 96 | 69 | 51 | — |
| EXAMPLE 3 | RESOL PHENOLIC RESIN | 0.9 | 54 | BORON CARBIDE 1 μm | 96 | 69 | 56 | — |
| EXAMPLE 4 | RESOL PHENOLIC RESIN | 1.1 | 66 | BORON CARBIDE 1 μm | 148 | 107 | 52 | — |
| | CARBON POWDER | 0.4 | 32 | | | | | |
| EXAMPLE 5 | RESOL PHENOLIC RESIN | 1.1 | 66 | BORON CARBIDE 1 μm | 148 | 107 | 52 | — |
| | MESOCARBON MICROBEADS | 0.4 | 34 | | | | | |
| EXAMPLE 6 | RESOL PHENOLIC RESIN | 1.1 | 66 | BORON CARBIDE 1 μm | 210 | 151 | 52 | — |
| | POWDERY PHENOLIC RESIN | 0.5 | 42 | | | | | |
| | CARBON POWDER | 0.4 | 32 | | | | | |
| EXAMPLE 7 | RESOL PHENOLIC RESIN | 1.1 | 60 | BORON CARBIDE 3 μm | 96 | 70 | 51 | — |
| EXAMPLE 8 | RESOL PHENOLIC RESIN | 1.1 | 60 | BORON CARBIDE 3 μm | 96 | 70 | 51 | — |
| EXAMPLE 9 | RESOL PHENOLIC RESIN | 1.5 | 90 | BORON CARBIDE 3 μm | 79 | 57 | 51 | — |
| | | | | SILICON CARBIDE 3 μm | 66 | 38 | | |
| EXAMPLE 10 | RESOL PHENOLIC RESIN | 0.8 | 44 | BORON CARBIDE 3 μm | 79 | 58 | 54 | — |
| | POWDERY PHENOLIC RESIN | 0.4 | 31 | SILICON CARBIDE 3 μm | 66 | 39 | | |
| EXAMPLE 11 | RESOL PHENOLIC RESIN | 0.8 | 44 | BORON CARBIDE 3 μm | 79 | 57 | 54 | — |
| | POWDERY PHENOLIC RESIN | 0.4 | 31 | SILICON CARBIDE 3 μm | 66 | 39 | | |
| EXAMPLE 12 | RESOL PHENOLIC RESIN | 0.8 | 48 | BORON CARBIDE 3 μm | 79 | 57 | 54 | — |
| | POWDERY PHENOLIC RESIN | 0.4 | 34 | SILICON CARBIDE 10 μm | 66 | 38 | | |
| EXAMPLE 13 | RESOL PHENOLIC RESIN | 1.25 | 79 | BORON CARBIDE 3 μm | 149 | 107 | 59 | — |
| EXAMPLE 14 | RESOL PHENOLIC RESIN | 1.1 | 70 | BORON CARBIDE 1 μm | 96 | 73 | 51 | — |
| EXAMPLE 15 | RESOL PHENOLIC RESIN | 0.8 | 51 | BORON CARBIDE 3 μm | 149 | 113 | 57 | — |
| | POWDERY PHENOLIC RESIN | 0.4 | 35 | | | | | |
| EXAMPLE 16 | RESOL PHENOLIC RESIN | 0.8 | 51 | BORON CARBIDE 1 μm | 79 | 60 | 54 | — |
| | POWDERY PHENOLIC RESIN | 0.4 | 35 | SILICON CARBIDE 3 μm | 66 | 40 | | |
| EXAMPLE 17 | RESOL PHENOLIC RESIN | 1.1 | 73 | BORON CARBIDE 3 μm | 96 | 73 | 51 | — |
| EXAMPLE 18 | RESOL PHENOLIC RESIN | 1.1 | 73 | BORON CARBIDE 1 μm | 79 | 60 | 59 | — |
| | | | | SILICON CARBIDE 3 μm | 66 | 40 | | |
| EXAMPLE 19 | RESOL PHENOLIC RESIN | 1.21 | 73 | BORON CARBIDE 3 μm | 60 | 43 | 37 | 11 |
| EXAMPLE 20 | RESOL PHENOLIC RESIN | 1.2 | 72 | BORON CARBIDE 3 μm | 60 | 43 | 38 | 13 |
| EXAMPLE 21 | RESOL PHENOLIC RESIN | 1.2 | 76 | BORON CARBIDE 3 μm | 100 | 76 | 33 | 23 |
| EXAMPLE 22 | RESOL PHENOLIC RESIN | 0.8 | 48 | BORON CARBIDE 3 μm | 40 | 32 | 23 | 9 |
| COMP. EX. 1 | RESOL PHENOLIC RESIN | 1.1 | 66 | BORON CARBIDE 1 μm | 90 | 65 | 50 | — |
| COMP. EX. 2 | RESOL PHENOLIC RESIN | 1.1 | 66 | BORON CARBIDE 3 μm | 90 | 65 | 50 | — |
| COMP. EX. 3 | RESOL PHENOLIC RESIN | 1.1 | 66 | BORON CARBIDE 10 μm | 100 | 72 | 52 | — |
| COMP. EX. 4 | RESOL PHENOLIC RESIN | 0.8 | 51 | BORON CARBIDE 10 μm | 79 | 60 | 54 | — |
| | POWDERY PHENOLIC RESIN | 0.4 | 35 | SILICON CARBIDE 10 μm | 66 | 40 | | |
| COMP. EX. 5 | RESOL PHENOLIC RESIN | 1.25 | 75 | — | 0 | 0 | 0 | — |
| COMP. EX. 6 | RESOL PHENOLIC RESIN | 1.25 | 70 | — | 0 | 0 | 0 | — |
| COMP. EX. 7 | RESOL PHENOLIC RESIN | 1.2 | 76 | BORON CARBIDE 3 μm | 40 | 29 | 29 | 10 |

FIG. 1(c)

| | BULK DENSITY (g/cm³) | BENDING STRENGTH (MPa) | WEIGHT LOSS DUE TO OXIDATION LOSS IN THE ATMOSPHERE AFTER SEVEN HOURS (%) | | | |
|---|---|---|---|---|---|---|
| | | | 800°C | 900°C | 1000°C | 1200°C |
| EXAMPLE 1 | 1.581 | 75 | 0 | 2 | — | — |
| EXAMPLE 2 | 1.672 | 80 | 0 | 1 | — | — |
| EXAMPLE 3 | 1.735 | 85 | 0 | 1 | — | — |
| EXAMPLE 4 | 1.403 | 45 | 0 | 1 | — | — |
| EXAMPLE 5 | 1.526 | 65 | 0 | 3 | — | — |
| EXAMPLE 6 | 1.57 | 100 | 0 | 2 | — | — |
| EXAMPLE 7 | 1.827 | 85 | 0 | 2 | — | — |
| EXAMPLE 8 | 1.817 | 85 | 0 | 3 | — | — |
| EXAMPLE 9 | 1.786 | 70 | 0 | 0 | 0 | 6 |
| EXAMPLE 10 | 1.829 | 95 | 0 | 0 | 0 | 7 |
| EXAMPLE 11 | 1.711 | 90 | 0 | 0 | 0 | 7 |
| EXAMPLE 12 | 1.634 | 80 | 0 | 0 | 0 | 5 |
| EXAMPLE 13 | 1.682 | 120 | 0 | 4 | — | — |
| EXAMPLE 14 | 1.669 | 110 | 0 | 4 | — | — |
| EXAMPLE 15 | 1.807 | 140 | 0 | 2 | — | — |
| EXAMPLE 16 | 1.784 | 120 | 0 | 0 | 0 | 10 |
| EXAMPLE 17 | 1.669 | 80 | 0 | 5 | — | — |
| EXAMPLE 18 | 1.49 | 70 | 0 | 0 | 0 | 10 |
| EXAMPLE 19 | 1.63 | 90 | 0 | — | — | — |
| EXAMPLE 20 | 1.33 | 34 | 0 | — | — | — |
| EXAMPLE 21 | 1.51 | 110 | 0 | — | — | — |
| EXAMPLE 22 | 1.48 | 45 | 0 | — | — | — |
| COMP. EX. 1 | 1.632 | 70 | 3 | 8 | — | — |
| COMP. EX. 2 | 1.632 | 70 | 4 | 9 | — | — |
| COMP. EX. 3 | 1.561 | 60 | 4 | 10 | — | — |
| COMP. EX. 4 | 1.784 | 100 | 2 | 9 | 13 | 22 |
| COMP. EX. 5 | 1.316 | 75 | 79 | 100 | — | — |
| COMP. EX. 6 | 1.389 | 90 | 85 | 100 | — | — |
| COMP. EX. 7 | 1.32 | 32 | 5 | — | — | — |

OXIDATION RESISTANT CARBON FIBER REINFORCED CARBON COMPOSITE MATERIAL AND PROCESS FOR PRODUCING THE SAME

TECHNICAL FIELD

The present invention relates to a carbon fiber reinforced carbon composite material having oxidation resistance, and particularly to an oxidation resistant carbon fiber reinforced carbon composite material used under high-temperature oxidizing atmospheres, which may be used for sliding members for machines, members for metallurgy, trays or shelf boards of heat treat furnaces for sintering ceramics or for heat-treating ferrites, members for hot pressing, materials used in glass-bottle production lines, and furthermore members for aerospace applications.

BACKGROUND ART

A carbon fiber reinforced carbon composite material (hereinafter referred to as a C/C composite) is a material resulting from a great improvement in mechanical characteristic disadvantages, such as low toughness and brittle fracture, of artificial graphite materials that are used for electrodes or isotropic graphites. However, the C/C composite is a carbon material, too, and therefore disadvantageously suffers from oxidation loss in the air when exposed to a high temperature of 400 to 500 degrees C. or higher. Thus, the C/C composite is also limited in its scope of use. As solutions therefor, known are approaches of: (1) coating the C/C composite with ceramics excellent in oxidation resistance such as $SiO_2$, $B_2O_3$—SiC, $B_4C$, etc.; (2) conversion into SiC, etc.; (3) combination of (1) and (2) to give the C/C composite a functionally gradient characteristic; (4) impregnating the C/C composite with metal alkoxide to incorporate SiC, $B_4C$, or oxides thereof into a whole of the C/C composite; (5) impregnating the C/C composite with $B_2O_3$ (Japanese Patent No. 3135129); (6) mixing $B_4C$ into a felt C/C composite during an ordinary production process therefor (Japanese Patent Laid-Open No. H05-306180), and the like.

However, the aforementioned approaches involve the respective problems that: (1) it is hard to maintain the oxidation resistance when a coating layer is damaged; (2) fibers become brittle, mechanical characteristics deteriorate, and vulnerability to thermal shock is increased; (3) costs become higher (this approach is unsuitable for general use although successful for aerospace applications); (4) the metal alkoxide is expensive; (5) a heating and impregnating device (device for applying hot isostatic press) is required and thus costs increase, and, in addition, the device is limited in size; (6) there can be obtained only a felt C/C composite of felt type that adopts a felt as a carbon fiber and a pyrolytic carbon as a matrix.

Japanese Patent No. 3058180 discloses a method of applying a mixture of boron carbide with a thermosetting resin, coal tar, or pitch to serve as a matrix, and a method of incorporating $B_4C$ into a C/C composite by means of thermal decomposition of boron-containing gas, to reveal that, at 1200 degrees C., the obtained C/C composite exhibits oxidation loss at a lower speed as compared with materials containing no boron carbide. However, this method fails to propose a definite approach for uniformly dispersing $B_4C$ throughout a C/C composite. In addition, oxidation resistance due to containing of $B_4C$ basically results from an oxidation-resistant protective coating of $B_2O_3$. At a temperature exceeding 800 degrees C., accordingly, $B_2O_3$ evaporates to provide no fundamental oxidation resistance, but nevertheless Japanese Patent No. 3058180 shows no evaluation for oxidation at a temperature around 800 degrees C.

Japanese Patent Laid-Open No. H04-214073 discloses an oxidation resistant C/C composite that comprises, as a matrix, carbon in which dispersed are 10 to 50 volume % of ceramic having a particle diameter of 10 μm or less (boron carbide, silicon carbide, etc.), and also comprises, as a reinforcing material, 20 to 40 volume % of long carbon fibers. However, most Examples therein exhibited weight loss in two to four hours even at 800 degrees C. in the atmosphere, and thereafter exhibited a tendency of further weight loss. Even the best one of these Examples exhibited weight loss in seven hours, and thereafter exhibited a tendency of further weight loss. Accordingly, the material disclosed therein substantially provides only a small availability. Like this, when considering a matter of costs, the existing circumstances see no oxidation resistant C/C composite available as industrial materials for general industry.

A C/C composite in the most common use today is a 2D-C/C composite using two-dimensional cloths. Therefore, as an oxidation-resistant material for general industry as well, the 2D-C/C composite is the most available and highly required. A production of an oxidation resistant C/C composite adopting the 2D-C/C composite is more difficult than a production of the same adopting a felt C/C composite or a 1D-C/C composite using one-dimensional carbon fibers. Thus, there has been an insufficient development for providing the whole of these materials with oxidation-resistance and self-sealing ability for practical use.

An object of the present invention is to provide an oxidation resistant C/C composite by means of a simple production process, which is widely available for general industry and provided with oxidation resistance under a high temperature in the atmosphere, without failing such characteristics of a C/C composite as high strength and high toughness.

DISCLOSURE OF THE INVENTION

Wholehearted investigation by the present inventors in order to solve the aforementioned problems has revealed considerable importance of a selection and a content of ceramic powder that serves to give sufficient oxidation-resistance to a C/C composite, and also considerable importance of a method for dispersing the ceramic powder, and thus the present invention has been accomplished. An oxidation resistant C/C composite according to the present invention comprises a matrix and 20 volume % or more of carbon fibers, and is characterized in that: the matrix contains ceramic powder that includes boron carbide powder having an average particle diameter of 5 μm or less; and an amount of the ceramic powder is 32 volume % or more based on volume of the carbon fibers.

The matrix contains the 32 volume % or more of ceramic powder based on the volume of the carbon fibers. Therefore, at a high temperature, the ceramic powder oxidizes to form an oxidation-resistant protective coating throughout the C/C composite. The amount of the ceramic powder is preferably 32 to 76 volume % based on the volume of the carbon fibers. An amount of the ceramic powder less than 32 volume % results in a difficulty in forming the oxidation-resistant protective coating throughout the C/C composite. An amount of the ceramic powder more than 76 volume % causes an increase in cost and decrease in strength. As an amount of the ceramic powder becomes larger, there can be more tendency that surplus ceramic powder remains on surfaces of carbon fiber cloths or carbon fiber sheets to make a production of the C/C composite difficult. However, when the ceramic powder in the matrix is 32 volume % or more based on the volume of the carbon fibers, merely a simple mixing of the ceramic powder during a mixing process causes aggregations of and therefore local collections of the ceramic powder, thereby failing to form a uniform oxidation-resistant protective coating. In addition, nonuniformity of the C/C composite leads to deterioration in characteristics such as mechanical strength. This problem can be solved by sufficiently crushing the ceramic powder with shearing force applied thereon by using a super mixer, etc., and then mixing the crushed ceramic powder such that it may avoid aggregation with another matrix or matrix precursor as well.

An average particle diameter of the ceramic powder is 5 µm or less, preferably 3 µm or less, and more preferably 1 to 3 µm. By setting the average particle diameter of the ceramic powder at 5 µm or less, deterioration in mechanical strength can be prevented and the ceramic powder can be uniformly dispersed into the matrix. When the average particle diameter of the ceramic powder is set at a value much less than 1 µm, e.g., 0.5 µm or less, there arises a problem of increased costs. When two or more types of ceramic powder are to be added, it is necessary that the ceramic powder includes boron carbide powder having an average particle diameter of 5 µm or less.

As examples of the ceramic powder, there may be mentioned boron carbide powder in single, or a combination of boron carbide powder with silicon carbide powder, zirconium boride powder, titanium boride powder, aluminium oxide powder, and the like.

The boron carbide powder and the silicon carbide powder are particularly preferable as the ceramic powder. As for the type of the ceramic powder, a single use of the boron carbide can prevent oxidation loss in a temperature range substantially up to 800 degrees C. A single use of the silicon carbide results in a difficulty in forming an oxidation-resistant coating, and thus oxidation resistance undergoes substantially no improvement. In this case, therefore, availability as industrial materials is small. In case of a mixture of two types of powder, i.e., the boron carbide powder and the silicon carbide powder, oxidation resistance can be maintained at a temperature exceeding 800 degrees C. An oxidation resistance temperature is determined depending on viscosity and an evaporating temperature of an oxidation-resistant protective coating that is formed at a high temperature in an oxidizing atmosphere. The oxidation resistance temperature is controlled in accordance with combinations of selected ceramic powders. When the boron carbide powder is singularly used, for example, formed is an oxidation-resistant coating comprising glassy boron oxide. When the boron carbide powder and the silicon carbide powder are used, a glass layer comprising mixed boron oxide and silicon oxide is formed to serve as an oxidation-resistant coating. In this way, conditions could be set in accordance with purposes such that there may be formed an oxidation-resistant coating capable of developing oxidation resistance within a significant temperature range. For example, in order to develop oxidation resistance over as wide a temperature range as possible, it is preferable that an amount of boron carbide mixed with silicon carbide is, by weight, approximately 1.2 times amount of the silicon carbide.

A volume fraction of the carbon fibers is 20 volume % or more, and preferably 20 to 50 volume %. When a volume fraction of the carbon fibers exceeds 50 volume %, binding power between carbon fiber cloths or carbon fiber sheets cannot sufficiently be maintained, and therefore a production of a C/C composite becomes practically difficult in the present invention. When a volume fraction of the carbon fibers is less than 20 volume %, there are small effects of the carbon fibers, without high toughness and mechanical strength.

The carbon fibers comprise any one of a fine-woven spun-yarn cloth; a two-dimensional-woven cloth of continuous threads of long carbon fibers; a one-dimensional long carbon fiber sheet; short carbon fibers and a fine-woven spun-yarn cloth; short carbon fibers and a two-dimensional-woven cloth of continuous threads of long carbon fibers; and short carbon fibers and a one-dimensional long carbon fiber sheet. It is also possible to use a combination of any two or more among the fine-woven spun-yarn cloth, the cloth of continuous threads of long carbon fibers, and the one-dimensional long carbon fiber sheet. In particular, a combination of the fine-woven spun-yarn cloth and the cloth of continuous threads of long carbon fibers results in a C/C composite having high toughness.

As the two-dimensional-woven cloth (hereinafter referred to as a 2D cloth), there may be used ones in which a fiber diameter is 10 to 20 µm and the number of filaments is 1000 to 12000. In addition, such a cloth may be selected, in accordance with its intended use, from satin-woven or plain-woven cloths of continuous threads of long fibers, and a fine-woven spun-yarn cloth obtained by spinning fibers, etc.

The matrix includes a carbon compound resulting from liquid synthetic resin or from liquid synthetic resin and powdery synthetic resin. Moreover, the matrix includes mesocarbon microbeads and/or carbon powder having 5 to 15 weight % of residual volatile matter.

A phenolic resin capable of high yield of carbonization is preferably adopted as the synthetic resin. Production costs can thereby be reduced. In addition, an adoption of the phenolic resin allows short carbon fiber chops to be added as a reinforcer. Instead of the phenolic resin, a furan resin, etc., may also be adopted. Ethyl alcohol, etc., may be adopted as a solvent.

The oxidation resistant carbon fiber reinforced carbon composite material according to the present invention comprises the matrix and 20 volume % or more of carbon fibers. A slurried matrix precursor is formed by mixing the liquid synthetic resin with the ceramic powder that includes, based on the volume of the carbon fibers, 32 volume % or more of boron carbide powder having an average particle diameter of 5 µm or less. The resulting matrix precursor is then uniformly applied to cloth-form or sheet-form carbon fibers, which are subsequently put in layers and baked, to thereby obtain the present oxidation resistant carbon fiber reinforced carbon composite material.

Alternatively, the slurried matrix precursor is uniformly infiltrated into cloth-form or sheet-form carbon fibers and, further, uniformly applied to surfaces of the carbon fibers, which are subsequently put in layers and baked. The matrix precursor can thereby be spread throughout the carbon fibers.

Alternatively, the slurried matrix precursor is uniformly infiltrated into cloth-form or sheet-form carbon fibers and, further, uniformly applied to surfaces of the carbon fibers, which are subsequently put in layers, baked, and then further impregnated with pitch or synthetic resin to be carbonized.

In these cases, a viscosity of the slurried matrix precursor is adjusted at 5 to 40 mPa-s, and preferably at 8 to 25 mPa-s. When this viscosity is high, infiltration of the matrix precursor into the carbon fiber cloths or carbon fiber sheets becomes insufficient. When the viscosity is too low, on the other hand, it becomes hard to have a sufficient amount of boron carbide powder be present on a unit area.

The matrix precursor may also contain the mesocarbon microbeads, the carbon powder including 5 to 15 weight % of residual volatile matter, the short carbon fibers, and the like. This leads to improvements in mechanical characteristics.

It is also possible that ceramic powder and any one or more among synthetic resin powder, mesocarbon microbeads, carbon powder including 5 to 15 weight % of residual volatile matter, and short carbon fibers, are integrally made into solid fine particles to obtain powder, and then a slurried matrix precursor mixed with the obtained powder is uniformly applied to cloth-form or sheet-form carbon fibers, which are subsequently put in layers and baked. Moreover, it is also possible that a slurried matrix precursor is uniformly applied to cloth-form or sheet-form carbon fibers, and then powder of solid fine particles integrally made from ceramic powder and any one or more among synthetic resin powder, mesocarbon microbeads, carbon powder including 5 to 15 weight % of residual volatile matter, and short carbon fibers, is uniformly applied further to surfaces of the cloth-form or sheet-form carbon fibers, which are subsequently put in layers and baked.

Thereby, each of the synthetic resin powder, the mesocarbon microbeads, the carbon powder including 5 to 15 weight % of residual volatile matter, the short carbon fibers, and the ceramic powder can disperse uniformly, and at the same time a binder can effectively demonstrate its functions, so as to improve mechanical characteristics. For an operation of integrally making the solid fine particles, used is, for example, a commercially available apparatus for compositing fine particles.

BRIEF DESCRIPTION OF THE DRAWINGS

FIGS. 1(a), 1(b), and 1(c) are tables showing particulars of Examples and Comparative Examples of the present invention;

BEST MODE FOR CARRYING OUT THE INVENTION

Figure 2:
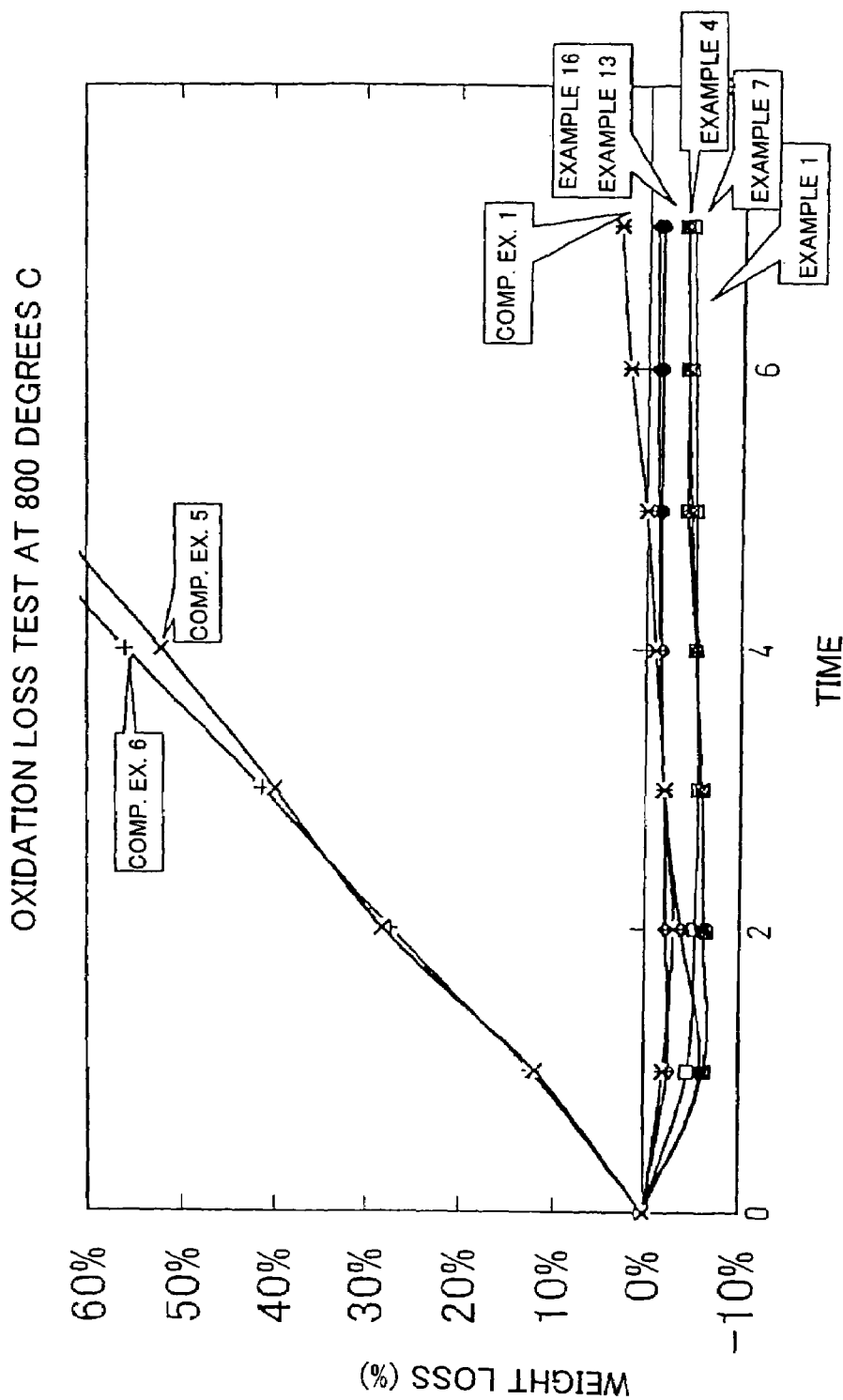
FIG. 2 is a graph showing weight loss due to oxidation at 800 degrees C. in the atmosphere with respect to Examples 1, 4, 7, 13 and 16, and Comparative Examples 1, 5 and 6 of the present invention.

For an oxidation resistant C/C composite of the present invention, firstly, carbon fibers and a matrix precursor are combined to prepare a preform. During a preparation of the preform, it is necessary to combine the matrix and the carbon fibers in a sufficiently uniform manner. Configurations of the carbon fibers include two-dimensional cloths, one-dimensional sheets, and the like. A slurried matrix precursor is applied to these carbon fibers. This application of the slurried matrix precursor is performed by applying the slurry to surfaces of the carbon fibers using brushes or doctor blades, or by rubbing and infiltrating the slurry into the carbon fibers. Here, a viscosity of the slurried matrix precursor is adjusted at 5 to 40 mPa-s, and preferably at 8 to 25 mPa-s. When this viscosity is high, infiltration of the matrix precursor into the carbon fiber cloths or carbon fiber sheets becomes insufficient. When the viscosity is too low, on the other hand, it becomes hard to have a sufficient amount of boron carbide powder be present on a unit area. The viscosity can be adjusted by properly adding ethyl alcohol, etc., and the like.

For the matrix precursor, a synthetic resin as a binder component is mixed with mesocarbon microbeads, carbon powder including volatile matter, or short carbon fibers as other components. Although no particular limitation is put on a type of the synthetic resin, phenolic resins and furan resins are suitable because of their high yield of carbonization and easy availability in terms of costs, etc. In case of using and mixing a synthetic resin taking a liquid form in the ordinary temperature, firstly ceramic powder is dispersed into alcohols such as ethanol in order to avoid reaggregation, and subsequently the obtained dispersion liquid is stirred well together with the synthetic resin and other matrix components into a slurry form, to thereby form the matrix precursor.

In case of using a synthetic resin taking a solid powdery form in the ordinary temperature and mixing the synthetic resin powder with mesocarbon microbeads, carbon powder including volatile matter, short carbon fiber chops and the like; these powders and the ceramic powder are made into solid fine particles so that they may integrate with each other. Thereby, each of these powders can disperse uniformly, and at the same time a binder can effectively demonstrate its functions, so as to improve mechanical characteristics. For an operation of making the solid fine particles, used is, for example, a commercially available apparatus for compositing fine particles.

A combined use of the above-mentioned slurry and solid fine particles is also acceptable. That is, for example, the slurry is applied to carbon fiber cloths or carbon fiber sheets, on which the solid fine particles may subsequently be put, and then carbon fiber cloths or carbon fiber sheets may further be laminated thereon.

Other than the synthetic resin, for example, mesocarbon microbeads having approximately 10 weight % of volatile matter, or carbon powder having 5 to 15 weight %, preferably 7 to 12 weight %, of volatile matter, may be added as a component of the matrix precursor for densification of the matrix precursor. In this case, when an amount of carbon to be generated from these components is set at a large value, large cracks are formed in the matrix and therefore mechanical strength considerably deteriorates. This is because the mesocarbon microbeads and the carbon powder having volatile matter incur contractions while the carbon fibers incur no contraction, so that internal stress arises. In relieving this internal stress, the above-mentioned cracks are formed. In order to prevent the cracks, it is necessary that mesocarbon microbeads and carbon powder having as high volatile matter as more than 15 weight % are not used, and that an amount of carbon resulting from mesocarbon microbeads and carbon powder having volatile matter is set at approximately 30 volume % or less of a total matrix. The remaining proportion is occupied by the ceramic powder and resin carbon resulting from the synthetic resin.

The cloths or sheets applied with the slurry are put in layers having a predetermined thickness, e.g., a thickness of 3 to 30 mm, to form a prepreg layered structure. The prepreg layered structure is hot-pressed and formed into a preform. Conditions in the hot-pressing should be determined in accordance with a type of synthetic resin used, a type and amount of carbon fibers used, and a size of the preform, etc. Generally, however, the hot press is performed under a pressure of 5 to 15 kg/cm$^2$ at a maximum temperature of 150 to 300 degrees C. The obtained preform is carbonized and thereby made into an oxidation resistant C/C composite. In this process, the preform is subjected to heat treatment of 800 to 2000 degrees C. in a non-oxidizing atmosphere such as a nitrogen gas atmosphere. Variation in heat-treatment temperature causes no prominent change in oxidation resistance and in mechanical characteristics, as long as the variation stays within the above-mentioned temperature range. Accordingly, the heat treatment could be performed at a temperature suitable for applications of a resulting C/C composite.

In addition, a temperature up to which oxidation resistance is maintained can be controlled by selecting a type and a combination of the ceramic powder used. For example, when an operation temperature range of the C/C composite is 800 degrees C. or less in the atmosphere, boron carbide powder is adopted as the ceramic powder. In a range exceeding 800 degrees C. up to 1200 degrees C., both of boron carbide powder and silicon carbide powder are used, to thereby obtain an oxidation resistant C/C composite that suffers from substantially a little oxidation loss. Like this, the oxidation resistant C/C composite of the present invention can be formed through a simple process, have sufficient toughness, and maintain good points of the mechanical characteristics of a C/C composite.

After the heat treatment process, the preform may further be impregnated with pitch or a synthetic resin, for its carbonization. Even after this process, oxidation resistance characteristics do not deteriorate. Therefore, oxidation resistance is improved, and at the same time further densification is achieved due to impregnation with the pitch or the synthetic resin, so that the mechanical characteristics can also be improved.

In the following, the present invention will specifically be described through Examples.

EXAMPLE 1

Boron carbide powder having an average particle diameter of 3 μm was added to ethyl alcohol such that a volume fraction of the boron carbide powder in a matrix may be 51 volume %, and then the boron carbide powder was well stirred and dispersed. An amount of the ethyl alcohol used was substantially equal to an amount of synthetic resin to be added in the next step. A resol phenolic resin as a liquid synthetic resin was added thereto at a weight ratio of 1.1 with respect to carbon fibers, and then well stirred and dispersed to be made into slurry, so that a matrix precursor was prepared.

The slurry was uniformly applied to 2D fine-woven cloths (which are PAN-based ones having a fiber diameter of about 10 μm) using a doctor blade. At this time, in order to infiltrate the slurry into the cloths, this process involved an ingenuity of applying in advance a part of the slurry to the cloths in a rubbing manner and then applying the remaining slurry to surfaces of the cloths. The cloths having the slurry applied thereto were put in layers and air-dried. The cloth had a size of 80 mm×80 mm, and fifteen cloths were put in layers to form a prepreg layered structure having a thickness of about 7 mm.

Next, a thermal pressure molding was conducted in accordance with a conventional method. In this molding, a pressure of about 10 kg/cm$^2$ was applied to the prepreg layered structure, and, in this condition, a pressure application started from 110 degrees C. Then, the prepreg layered structure was maintained at 160 degrees C. for an hour. Subsequently, the prepreg layered structure was subjected to a heat treatment at 260 degrees C. for 16 hours using a dryer, so that a preform was formed.

The obtained preform was baked under a heat treatment in a stream of nitrogen gas at a temperature rise rate of about 10 degrees C./hour up to 1000 degrees C. Thereby, a C/C composite was obtained.

EXAMPLE 2

A C/C composite was obtained through the same procedure as in Example 1, except that boron carbide powder having an average particle diameter of 1 μm was adopted.

EXAMPLE 3

A C/C composite was obtained through the same procedure as in Example 1, except that boron carbide powder having an average particle diameter of 1 μm was added such that its volume fraction in a matrix may be 56 volume %, and such that a resol phenolic resin was added at a weight ratio of 0.9 with respect to carbon fibers.

EXAMPLE 4

As a matrix precursor, boron carbide powder having an average particle diameter of 1 μm was sufficiently mixed with carbon powder with shearing force applied thereon by using a super mixer. An amount of the boron carbide powder was such that its volume fraction in a matrix may be 52 volume %. An amount of the carbon powder was such that its weight ratio to carbon fibers may be 0.4. The mixer rotated its blades at a speed of 2000 rpm for three minutes. A lack of this process causes a difficulty in sufficient mixing of the boron carbide powder and the carbon powders. Resulting mixed powder was well stirred in and dispersed into ethyl alcohol. An amount of the alcohol used was substantially equal to an amount of resin to be added in the next step. Next, a resol phenolic resin was added thereto at a weight ratio of 1.1 with respect to carbon fibers, and then well stirred and dispersed to be made into slurry. A C/C composite was obtained through the same procedure as in Example 1 except for the above.

EXAMPLE 5

As a matrix precursor, boron carbide powder having an average particle diameter of 1 μm was sufficiently mixed with mesocarbon microbeads with shearing force applied thereon by using a super mixer. An amount of the boron carbide powder was such that its volume fraction in a matrix may be 52 volume %. An amount of the mesocarbon microbeads was such that its weight ratio to carbon fibers may be 0.4. The mixer rotated its blades at a speed of 2000 rpm for three minutes. A lack of this process causes a difficulty in sufficient mixing of the boron carbide powder and the mesocarbon microbeads. Resulting mixed powder was well stirred in and dispersed into ethyl alcohol. An amount of the alcohol used was substantially equal to an amount of resin to be added in the next step. Next, a resol phenolic resin was added thereto at a weight ratio of 1.1 with respect to carbon fibers, and then well stirred and dispersed to be made into slurry. A C/C composite was obtained through the same procedure as in Example 1 except for the above.

EXAMPLE 6

For a matrix precursor, two types of matrix precursor were prepared. As for one of them, boron carbide powder having an average particle diameter of 1 μm was well stirred in and dispersed into ethyl alcohol. An amount of the boron carbide powder was such that its volume fraction in a matrix may be 26 volume %. A resol phenolic resin was added thereto at a weight ratio of 1.1 with respect to carbon fibers, and then well stirred and dispersed to be made into slurry (which is referred to as "A"). As for the other matrix precursor, boron carbide powder having an average particle diameter of 1 μm, carbon powder, and powdery phenolic resin as synthetic resin powder were sufficiently mixed with one another with shearing force applied thereon by using a super mixer. An amount of the boron carbide powder was such that its volume fraction in a matrix may be 26 volume %. An amount of the carbon powder was such that its weight ratio to carbon fibers may be 0.4. An amount of the powdery phenolic resin was such that its weight ratio to carbon fibers may be 0.5. The mixer rotated its blades at a speed of 1500 rpm for three minutes. A resulting mixture was made into composite fine particles using a hybridizer of Nara Machinery Co., Ltd., for three minutes at a blade rotational speed of 12000 rpm (an obtained material is referred to as "B").

Then, the matrix precursor A was mixed with the matrix precursor B (in powdery form), and their mixture was uniformly applied to fine-woven cloths in the manner described in Example 1. Fifteen of these cloths were put in layers to form a prepreg layered structure having a thickness of about 9 mm.

A molding was performed in which a pressure of about 10 kg/cm$^2$ was applied to the prepreg layered structure, and, in this condition, a pressure application started from 110 degrees C. Then, the prepreg layered structure was maintained at 260 degrees C. for an hour. Subsequently, the prepreg layered structure was subjected to a heat treatment at 300 degrees C. for 16 hours in a dryer to form a preform. Thereafter, the same procedure as in Example 1 was performed, to obtain a C/C composite.

EXAMPLE 7

For a matrix precursor, boron carbide powder having an average particle diameter of 3 μm was sufficiently mixed with short carbon fibers having an average length of 30 μm with shearing force applied thereon by using a super mixer. An amount of the boron carbide powder was such that its volume fraction in a matrix may be 51 volume %. An amount of the short carbon fibers was such that their volume fraction in total materials may be 10 volume %. The mixer rotated its blades at a speed of 2000 rpm for three minutes. Resulting mixed powder was well stirred in and dispersed into ethyl alcohol. An amount of the alcohol used was substantially equal to an amount of resin to be added in the next step. Next, a resol phenolic resin was added thereto at a weight ratio of 1.1 with respect to carbon fibers contained in materials, and then well stirred and dispersed to be made into slurry. A C/C composite was obtained through the same procedure as in Example 1 except for the above.

EXAMPLE 8

For a matrix precursor, boron carbide powder having an average particle diameter of 3 μm was sufficiently mixed with short carbon fibers having an average length of 1000 μm with shearing force applied thereon by using a super mixer. An amount of the boron carbide powder was such that its volume fraction in a matrix may be 51 volume %. An amount of the short carbon fibers was such that their volume fraction in total materials may be 5 volume %. The mixer rotated its blades at a speed of 2000 rpm for three minutes. Resulting mixed powder was well stirred in and dispersed into ethyl alcohol. An amount of the alcohol used was substantially equal to an amount of resin to be added in the next step. Next, a resol phenolic resin was added thereto at a weight ratio of 1.1 with respect to carbon fibers in materials, and then well stirred and dispersed to be made into slurry. A C/C composite was obtained through the same procedure as in Example 1 except for the above.

EXAMPLE 9

For a matrix precursor, boron carbide powder having an average particle diameter of 3 μm and silicon carbide powder having an average particle diameter of 3 μm were well stirred in and dispersed into ethyl alcohol such that a volume fraction of ceramic powder in a matrix may be 51 volume %. A volume fraction of the boron carbide powder to carbon fibers in materials was 57 volume %. A volume fraction of the silicon carbide powder to the carbon fibers in the materials was 38 volume %. An amount of the alcohol used was substantially equal to an amount of resin to be added in the next step. Next, a resol phenolic resin was added thereto at a weight ratio of 1.5 with respect to carbon fibers in materials, and then well stirred and dispersed to be made into slurry. A C/C composite was obtained through the same procedure as in Example 1 except for the above.

EXAMPLE 10

For a matrix precursor, two matrix precursors were prepared. As for one matrix precursor, boron carbide powder having an average particle diameter of 3 μm and silicon carbide powder having an average particle diameter of 3 μm were well stirred in and dispersed into ethyl alcohol. A volume fraction of the boron carbide powder to carbon fibers in materials was 29 volume %. A volume fraction of the silicon carbide powder to the carbon fibers in the materials was 19.5 volume %. An amount of the alcohol used was substantially equal to an amount of resin to be added in the next step. Next, a resol phenolic resin was added thereto at a weight ratio of 0.8 with respect to carbon fibers in materials, and then well stirred and dispersed to be made into slurry (which is referred to as "A"). As for the other matrix precursor, boron carbide powder having an average particle diameter of 3 μm, silicon carbide powder having an average particle diameter of 3 μm, short carbon fibers having an average length of 30 μm, and a powdery phenolic resin were sufficiently mixed with one another with shearing force applied thereon by using a super mixer. A volume fraction of the boron carbide powder to carbon fibers in materials was 29 volume %. A volume fraction of the silicon carbide powder to the carbon fibers in the materials was 19.5 volume %. A volume fraction of the short carbon fibers to total materials was 7 volume %. A weight ratio of the powdery phenolic resin to the carbon fibers in the materials was 0.4. The mixer rotated its blades at a speed of 1500 rpm for three minutes. A resulting mixture was made into composite fine particles using a hybridizer of Nara Machinery Co., Ltd., for three minutes at a blade rotational speed of 12000 rpm (an obtained material is referred to as "B"). A C/C composite was obtained through the same procedure as in Example 6 except for the above.

EXAMPLE 11

During a preparation of the matrix B of Example 10, short carbon fibers having an average length 1000 µm were used. A volume fraction of the short carbon fibers to total materials was 5 volume %. A C/C composite was obtained through the same procedure as in Example 10 except for the above.

EXAMPLE 12

For a matrix precursor, two matrix precursors were prepared. As for one matrix precursor, boron carbide powder having an average particle diameter of 3 µm and silicon carbide powder having an average particle diameter of 10 µm were well stirred in and dispersed into ethyl alcohol. A volume fraction of the boron carbide powder to carbon fibers in materials was 28.5 volume %. A volume fraction of the silicon carbide powder to the carbon fibers in the materials was 19 volume %. An amount of the alcohol used was substantially equal to an amount of resin to be added in the next step. Next, a resol phenolic resin was added thereto at a weight ratio of 0.8 with respect to the carbon fibers in the materials, and then well stirred and dispersed to be made into slurry (which is referred to as "A"). As for the other matrix precursor, boron carbide powder having an average particle diameter of 3 µm, silicon carbide powder having an average particle diameter of 10 µm, and a powdery phenolic resin were sufficiently mixed with one another with shearing force applied thereon by using a super mixer. A volume fraction of the boron carbide powder to the carbon fibers in the materials was 28.5 volume %. A volume fraction of the silicon carbide powder to the carbon fibers in the materials was 19 volume %. A weight ratio of the powdery phenolic resin to the carbon fibers in the materials was 0.4. The mixer rotated its blades at a speed of 1500 rpm for three minutes. A resulting mixture was made into composite fine particles using a hybridizer of Nara Machinery Co., Ltd., for three minutes at a blade rotational speed of 12000 rpm (an obtained material is referred to as "B"). A C/C composite was obtained through the same procedure as in Example 6 except for the above.

EXAMPLE 13

A C/C composite was obtained through the same procedure as in Example 1, except that plain-woven cloths were adopted as carbon fibers, that an amount of boron carbide powder having an average particle diameter of 3 µm was such that its volume fraction in a matrix may be 59 volume %, and that a resol phenolic resin was added at a weight ratio of 1.25 with respect to carbon fibers.

EXAMPLE 14

A C/C composite was obtained through the same procedure as in Example 1, except that plain-woven cloths were adopted as carbon fibers, that an amount of boron carbide powder having an average particle diameter of 1 µm was such that its volume fraction in a matrix may be 51 volume %, and that a resol phenolic resin was added at a weight ratio of 1.1 with respect to carbon fibers.

EXAMPLE 15

For a matrix precursor, two matrix precursors were prepared. As for one matrix precursor, boron carbide powder having an average particle diameter of 3 µm was well stirred in and dispersed into ethyl alcohol. An amount of the boron carbide powder was such that its volume fraction in a matrix may be 28.5 volume %. An amount of the alcohol used was substantially equal to an amount of resin to be added in the next step. Next, a resol phenolic resin was added thereto at a weight ratio of 0.8 with respect to carbon fibers in materials, and then well stirred and dispersed to be made into slurry (which is referred to as "A"). As for the other matrix precursor, boron carbide powder having an average particle diameter of 3 µm and a powdery phenolic resin were sufficiently mixed with each other with shearing force applied thereon by using a super mixer. A volume fraction of the boron carbide in a matrix was 28.5 volume %. A weight ratio of the powdery phenolic resin to the carbon fibers in the materials was 0.4. The mixer rotated its blades at a speed of 1500 rpm for three minutes. A resulting mixture was made into composite fine particles using a hybridizer of Nara Machinery Co., Ltd., for three minutes at a blade rotational speed of 12000 rpm (an obtained material is referred to as "B").

As the carbon fibers, adopted were plain-woven cloths. A C/C composite was obtained through the same procedure as in Example 6 except for the above.

EXAMPLE 16

For a matrix precursor, two matrix precursors were prepared. As for one matrix precursor, boron carbide powder having an average particle diameter of 1 µm and silicon carbide powder having an average particle diameter of 3 µm were well stirred in and dispersed into ethyl alcohol. A volume fraction of the boron carbide powder to carbon fibers in materials was 30 volume %. A volume fraction of the silicon carbide powder to the carbon fibers in the materials was 20 volume %. An amount of the alcohol used was substantially equal to an amount of resin to be added in the next step. Next, a resol phenolic resin was added thereto at a weight ratio of 0.8 with respect to the carbon fibers in the materials, and then well stirred and dispersed to be made into slurry (which is referred to as "A"). As for the other matrix precursor, boron carbide powder having an average particle diameter of 1 µm, silicon carbide powder having an average particle diameter of 3 µm, and a powdery phenolic resin were sufficiently mixed with one another with shearing force applied thereon by using a super mixer. A volume fraction of the boron carbide powder to the carbon fibers in the materials was 30 volume %. A weight ratio of the silicon carbide powder to the carbon fibers in the materials was 0.4. A volume fraction of the powdery phenolic resin to the carbon fibers in the materials was 40 volume %. The mixer rotated its blades at a speed of 1500 rpm for three minutes. A resulting mixture was made into composite fine particles using a hybridizer of Nara Machinery Co., Ltd., for three minutes at a blade rotational speed of 12000 rpm (an obtained material is referred to as "B"). A C/C composite was obtained through the same procedure as in Example 6 except for the above.

EXAMPLE 17

A C/C composite was obtained through the same procedure as in Example 1, except for an adoption of one-dimensional sheets as carbon fibers.

EXAMPLE 18

For a matrix precursor, boron carbide powder having an average particle diameter of 1 μm and silicon carbide powder having an average particle diameter of 3 μm were well stirred in and dispersed into ethyl alcohol such that a volume fraction of ceramic powder in a matrix may be 59 volume %. A volume fraction of the boron carbide powder to carbon fibers in materials was 60 volume %. A volume fraction of the silicon carbide powder to the carbon fibers in the materials was 40 volume %. An amount of the alcohol used was substantially equal to an amount of resin to be added in the next step. Next, a resol phenolic resin was added thereto at a weight ratio of 1.1 with respect to the carbon fibers in the materials, and then well stirred and dispersed to be made into slurry. As the carbon fibers, adopted were one-dimensional-sheets. A C/C composite was obtained through the same procedure as in Example 1 except for the above.

EXAMPLE 19

Boron carbide having an average particle diameter of 3 μm was added into ethyl alcohol, and well stirred and dispersed. An amount of the boron carbide was 43 parts by volume based on 100 parts by volume of carbon fibers. The boron carbide powder was in advance sufficiently mixed and crushed with shearing force applied thereon by using a super mixer. The super mixer performed mixing for three minutes at a blade rotational speed of 1500 rpm. The ethyl alcohol was 1.7 times the boron carbide by weight. A resol phenolic resin as a liquid synthetic resin was added thereto at a weight ratio of 0.8 with respect to carbon fibers, and then well stirred and dispersed to be made into slurry, so that a matrix precursor was prepared. The slurry was uniformly applied to 2D fine-woven spun-yarn cloths (which are PAN-based ones having a fiber diameter of about 10 μm) using a doctor blade. At this time, in order to infiltrate the slurry into the cloths, this process involved an ingenuity of applying in advance a part of the slurry to the cloths in a rubbing manner and then applying the remaining slurry to surfaces of the cloths. Here, a viscosity of the slurry at a working temperature was 11 mPa-s. The cloths having the slurry applied thereto were put in layers and air-dried. The cloth had a size of 80 mm×80 mm, and fifteen cloths were put in layers to form a prepreg layered structure having a thickness of about 5 mm. Next, a thermal pressure molding was conducted in accordance with a conventional method. In this molding, a pressure of about 40 kg/cm$^2$ was applied to the prepreg layered structure, and, in this condition, a pressure application started from 110 degrees C. Then, the prepreg layered structure was maintained at 160 degrees C. for an hour. Subsequently, the prepreg layered structure was subjected to a heat treatment at 260 degrees C. for 16 hours using a dryer, to form a preform.

The preform was baked through a heat treatment in a stream of nitrogen gas at a temperature rise rate of about 10 degrees C./hour up to 1000 degrees C. Thereby, a C/C composite was obtained. Further, under a vacuum pressure, the obtained C/C composite was impregnated with a liquid phenolic resin. Then, an impregnated C/C composite was baked and carbonized through a heat treatment at 1000 degrees C. in a stream of nitrogen gas. An obtained material had a bulk density of 1.63 g/cm$^3$ and a bending strength of 90 MPa.

EXAMPLE 20

Boron carbide having an average particle diameter of 3 μm was added into ethyl alcohol, and well stirred and dispersed. An amount of the boron carbide was 43 parts by volume based on 100 parts by volume of carbon fibers. The boron carbide powder was in advance sufficiently mixed and crushed with shearing force applied thereon by using a super mixer. The super mixer performed mixing for three minutes at a blade rotational speed of 1500 rpm. The ethyl alcohol was 1.7 times the boron carbide by weight. A resol phenolic resin as a liquid synthetic resin was added thereto at a weight ratio of 1.2 with respect to carbon fibers, and then well stirred and dispersed to be made into slurry, so that a matrix precursor was prepared. The slurry was uniformly applied to fine-woven spun-yarn cloths of 2D cloths (which are PAN-based ones having a fiber diameter of about 10 μm) using a doctor blade. At this time, in order to infiltrate the slurry into the cloths, this process involved an ingenuity of applying in advance a part of the slurry to the cloths in a rubbing manner and then applying the remaining slurry to surfaces of the cloths. Here, a viscosity of the slurry at a working temperature was 13 mPa-s. The cloths having the slurry applied thereto were put in layers and air-dried. The cloth had a size of 80 mm×80 mm, and fifteen cloths were put in layers to form a prepreg layered structure having a thickness of about 5 mm. Next, a thermal pressure molding was conducted in accordance with a conventional method. In this molding, a pressure of about 40 kg/cm$^2$ was applied to the prepreg layered structure, and, in this condition, a pressure application started from 110 degrees C. Then, the prepreg layered structure was maintained at 160 degrees C. for an hour. Subsequently, the prepreg layered structure was subjected to a heat treatment at 260 degrees C. for 16 hours using a dryer, to form a preform.

The preform was baked through a heat treatment in a stream of nitrogen gas at a temperature rise rate of about 10 degrees C./hour up to 1000 degrees C. Thereby, a C/C composite was obtained. An obtained material had a bulk density of 1.33 g/cm$^3$ and a bending strength of 34 MPa.

EXAMPLE 21

Boron carbide having an average particle diameter of 3 μm was added into ethyl alcohol, and well stirred and dispersed. An amount of the boron carbide was 76 parts by volume based on 100 parts by volume of carbon fibers. The boron carbide powder was in advance sufficiently mixed and crushed with shearing force applied thereon by using a super mixer. The super mixer performed mixing for three minutes at a blade rotational speed of 1500 rpm. A weight of the ethyl alcohol used was equal to that of the boron carbide. A resol phenolic resin as a liquid synthetic resin was added thereto at a weight ratio of 1.2 with respect to carbon fibers, and then well stirred and dispersed to be made into slurry, so that a matrix precursor was prepared. The slurry was uniformly applied to 3K plain-woven cloth of 2D cloth (which are PAN-based ones having a fiber diameter of about 10 μm) using a doctor blade. At this time, in order to infiltrate the slurry into the cloths, this process involved an ingenuity of applying in advance a part of the slurry to the cloths in a rubbing manner and then applying the remaining slurry to surfaces of the cloths. Here, a viscosity of the slurry at a working temperature was 23 mPa-s. The cloths having the slurry applied thereto were put in layers and air-dried. The cloth had a size of 80 mm×80 mm, and fifteen cloths were put in layers to form a prepreg layered structure having a thickness of about 4 mm. Next, a thermal pressure molding was conducted in accordance with a conventional method. In this molding, a pressure of about 40 kg/cm$^2$ was applied to the prepreg layered structure, and, in this condition, a pressure application started from 110 degrees C. Then, the prepreg layered structure was maintained at 160 degrees C. for an hour. Subsequently, the prepreg layered structure was subjected to a heat treatment at 260 degrees C. for 16 hours using a dryer, to form a preform.

The preform was baked through a heat treatment in a stream of nitrogen gas at a temperature rise rate of about 10 degrees C./hour up to 1000 degrees C. Thereby, a C/C composite was obtained. An obtained material had a bulk density of 1.51 g/cm$^3$ and a bending strength of 110 MPa.

EXAMPLE 22

Boron carbide having an average particle diameter of 3 μm was added into ethyl alcohol, and well stirred and dispersed. An amount of the boron carbide was 32 parts by volume based on 100 parts by volume of carbon fibers. The boron carbide powder was in advance sufficiently mixed and crushed with shearing force applied thereon by using a super mixer. The super mixer performed mixing for three minutes at a blade rotational speed of 1500 rpm. The ethyl alcohol was 2.5 times the boron carbide by weight. A resol phenolic resin as a liquid synthetic resin was added thereto at a weight ratio of 0.8 with respect to carbon fibers, and then well stirred and dispersed to be made into slurry, so that a matrix precursor was prepared. The slurry was uniformly applied to fine-woven spun-yarn cloths of 2D cloths (which are PAN-based ones having a fiber diameter of about 10 μm) using a doctor blade. At this time, in order to infiltrate the slurry into the cloths, this process involved an ingenuity of applying in advance a part of the slurry to the cloths in a rubbing manner and then applying the remaining slurry to surfaces of the cloths. Here, a viscosity of the slurry at a working temperature was 9 mPa-s. The cloths having the slurry applied thereto were put in layers and air-dried. The cloth had a size of 80 mm×80 mm, and fifteen cloths were put in layers to form a prepreg layered structure having a thickness of about 5 mm. Next, a thermal pressure molding was conducted in accordance with a conventional method. In this molding, a pressure of about 40 kg/cm$^2$ was applied to the prepreg layered structure, and, in this condition, a pressure application started from 110 degrees C. Then, the prepreg layered structure was maintained at 160 degrees C. for an hour. Subsequently, the prepreg layered structure was subjected to a heat treatment at 260 degrees C. for 16 hours using a dryer, to form a preform.

The preform was baked through a heat treatment in a stream of nitrogen gas at a temperature rise rate of about 10 degrees C./hour up to 1000 degrees C. Thereby, a C/C composite was obtained. An obtained material had a bulk density of 1.48 g/cm$^3$ and a bending strength of 45 MPa.

COMPARATIVE EXAMPLE 1

A C/C composite was obtained through the same procedure as in Example 2, except that a volume fraction of boron carbide powder in a matrix was 50 volume %.

COMPARATIVE EXAMPLE 2

A C/C composite was obtained through the same procedure as in Example 1, except that a volume fraction of boron carbide powder in a matrix was 50 volume %.

COMPARATIVE EXAMPLE 3

A C/C composite was obtained through the same procedure as in Example 1, except that boron carbide powder had an average particle diameter of 10 μm and that a volume fraction of the boron carbide powder in a matrix was 52 volume %.

COMPARATIVE EXAMPLE 4

A C/C composite was obtained through the same procedure as in Example 16, except that both boron carbide powder and silicon carbide powder in a matrix had an average particle diameter of 10 μm.

COMPARATIVE EXAMPLE 5

A C/C composite was obtained through the same procedure as in Example 1, except that a matrix contained no ceramic powder.

COMPARATIVE EXAMPLE 6

A C/C composite was obtained through the same procedure as in Example 13, except that a matrix contained no ceramic powder. In Comparative Examples 5 and 6, after applying a resin to cloths, a molding and a heat treatment were performed in accordance with the procedure of Examples 1 and 13.

COMPARATIVE EXAMPLE 7

A C/C composite was obtained through the same procedure as in Example 20, except that added was boron carbide powder having an average particle diameter of 3 μm in an amount of 29 parts by volume based on 100 parts by volume of carbon fibers. Here, a viscosity of the slurry at a working temperature was 10 mPa-s. An obtained material had a bulk density of 1.32 g/cm$^3$ and a bending strength of 32 MPa.

FIGS. 1(a, 1(b), and 1(c) are tables showing Examples and Comparative Examples collectively. FIGS. 1(a), 1(b), and 1(c) show types and volume fractions of carbon fibers, types of carbon precursor, weight ratios of carbon precursors to carbon fibers, types of ceramic powder, weight ratios and volume fractions of ceramic powders to carbon fibers, and volume fractions of ceramic powders in a matrix after a final heat treatment. FIGS. 1(a) and 1(b) show mix proportions of the materials in Examples and Comparative Examples. The matrix comprises a carbonized carbon precursor and ceramic powder. As characteristics of the obtained C/C composites, shown are bulk densities, bending strengths, oxidation losses in the atmosphere (FIG. 1(c)).

All the materials used in these Examples were commercially available ones. As the carbon fibers, used were (1) fine-woven spun-yarn cloths that are two-dimensional cloths (which are PAN-based ones having a fiber diameter of about 10 μm); (2) plain-woven cloths of continuous threads of long carbon fibers that are two-dimensional cloths (which are PAN-based ones having a tensile strength of 3500 MPa, a tensile modulus of 230 GPa, a fiber diameter of about 7 μm, and a filament number of 6000 (as called "6K")); (3) one-dimensional sheets of continuous threads of long carbon fibers (which are pitch-based ones having a tensile strength of 3600 MPa, a tensile modulus of 650 GPa, a fiber diameter of 10 μm, and a sheet thickness of 0.29 mm); and (4) short fibers (which are PAN-based ones having fiber lengths of 30 μm and 1000 μm). As the ceramic powder, used were (1) boron carbide powder (having average particle diameters of 1 μm, 3 μm, and 10 μm); and (2) silicon carbide powder (having average particle diameters of 1 μm, 3 μm, and 10 μm). The ceramic powder was used in a commercially available form, or alternatively used after classification. The particle diameters were examined with a laser-diffraction-type particle-distribution measurement device (SALD-2000A manufactured by Shimadzu Corporation). As the carbon precursor in the matrix, used were (1) a resol phenolic resin; (2) a powdery phenolic resin; (3) mesocarbon microbeads; and (4) carbon powder (having an average particle diameter of 5 μm and 10 weight % of volatile matter, obtained by hot-kneading and then pulverizing pitch and artificial graphite that has an average particle diameter of 1 μm).

In order to determine a volume fraction of the ceramic in the matrix, examined beforehand were carbonization yield of the carbon precursor and a true density of a carbon compound resulting from the carbon precursor. At 1000 degrees C., the mesocarbon microbeads had a carbonization yield of 90% and a true density of 1.9 g/cm$^3$, and the carbon powder had a carbonization yield of 90% and a true density of 2.0 g/cm$^3$. At 1000 degrees C., the resol phenolic resin had a carbonization yield of 50% and a true density of 1.5 g/cm$^3$, and the powdery phenolic resin had a carbonization yield of 70% and a true density of 1.5 g/cm$^3$. A true density of the boron carbide powder was 2.5 g/cm$^3$, and a true density of the silicon carbide powder was 3.1 g/cm$^3$.

A bending strength specimen used was a rectangular solid of 4 mm×8 mm×75 mm. In case of two-dimensional cloths, a surface direction of the cloths was defined as a longitudinal direction. In case of one-dimensional sheets, a fiber direction was defined as a longitudinal direction. A direction having 4 mm-length was a thickness direction of the cloths or sheets. A bending test was performed in a three-point bending method using an Instron testing machine under conditions of a span of 60 mm, a crosshead speed of 0.5 mm/min, and in the room temperature. It has been confirmed that any oxidation resistant C/C composite of the present Examples incurs no brittle fracture, exhibits the same crosshead displacement as usually exhibited by a commercially available 2D-C/C composite, and has the same toughness as that of a basic C/C composite.

The boron carbide powder having the smaller particle diameter resulted in the higher bending strength (compare, e.g., Example 1 with Example 2). A use of the powdery phenolic resin in combination resulted in an improvement in the bending strength (see, e.g., Examples 6, 15, and 16). This is presumably because the compositing of fine particles develops its effects well.

Oxidation loss in the atmosphere was tested at 800 degrees C., 900 degrees C., 1000 degrees C., and 1200 degrees C. using a commercially available electric furnace. A specimen was taken out of the electric furnace every hour to be weighed, so that a rate of weight change was determined. The C/C composites that contain, among the ceramic powders, only the boron carbide were weighed at 900 degrees C. at the most, because they exhibited monotonous weight loss at 900 degrees C. The C/C composites of Comparative Examples 5 and 6 containing no ceramic powder were weighed at 900 degrees C. at the most, because they exhibited considerable weight loss at 900 degrees C. in comparison with those containing ceramic powder.

FIGS. 2 to 6 show variations in weight loss of some Examples and Comparative Examples due to oxidation loss at the respective temperatures as plotted against lapse of time.

As shown in FIG. 2, at 800 degrees C., any Example exhibited a little weight increase at an initial stage of the oxidation loss test (weight increase is also denoted by zero, "0", in FIG. 1). There was observed no tendency of weight loss, and oxidation loss was substantially suppressed. Weight increase occurs because ceramic powder, particularly existing on a surface of a material, is oxidized to become an oxide compound. When there is observed weight increase only, it can be considered that substantially no oxidation loss is arising. When an initial stage of the oxidation loss test sees weight loss followed by no further weight loss observed, shown is that an oxidation-resistant coating completely covers a surface of a material to thereby suppress subsequent oxidation loss thereafter. Monotonous weight loss over time shows either that an oxidation-resistant coating is not formed uniformly over an entire surface of a material or that a ceramic oxide is evaporating. In Comparative Examples 1 to 4, monotonous weight loss over time was caused, though inconsiderably, even at 800 degrees C. This shows that, when a volume fraction of ceramic powder in a matrix is 50 volume % or when an average particle diameter of ceramic powder is as large as 10 μm, an oxidation-resistant coating fails to be formed well uniformly over an entire surface of a material.

Figure 3:
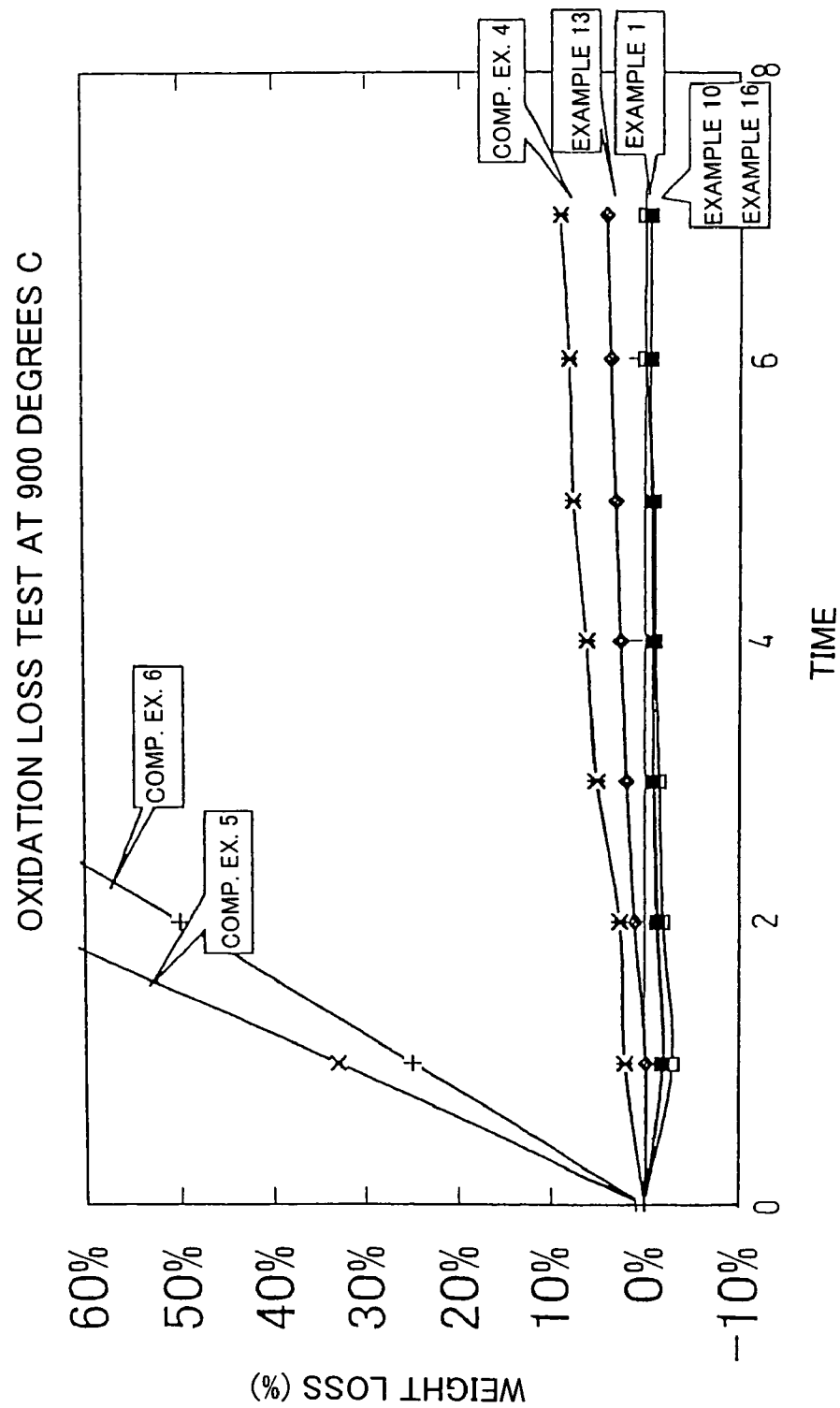
FIG. 3 is a graph showing weight loss due to oxidation at 900 degrees C. in the atmosphere with respect to Examples 1, 10, 13 and 16, and Comparative Examples 4, 5 and 6 of the present invention.

As shown in FIG. 3, among the materials of the present invention, the materials containing only the boron carbide powder exhibited, though inconsiderably, monotonous weight loss over time at 900 degrees C. This is presumably because of evaporation of boron oxide. Even at 900 degrees C., the materials of the present invention exhibited less weight loss not only than the materials containing no boron carbide powder (Comparative Examples 5 and 6) but also than the materials in Comparative Examples 1 to 4. The materials containing both boron carbide powder and silicon carbide powder exhibited no weight loss, and oxidation loss thereof was almost completely suppressed even at 900 degrees C. In Comparative Examples 5 and 6, at 900 degrees C., almost all the specimens disappeared in five hours due to oxidation.

Figure 4:
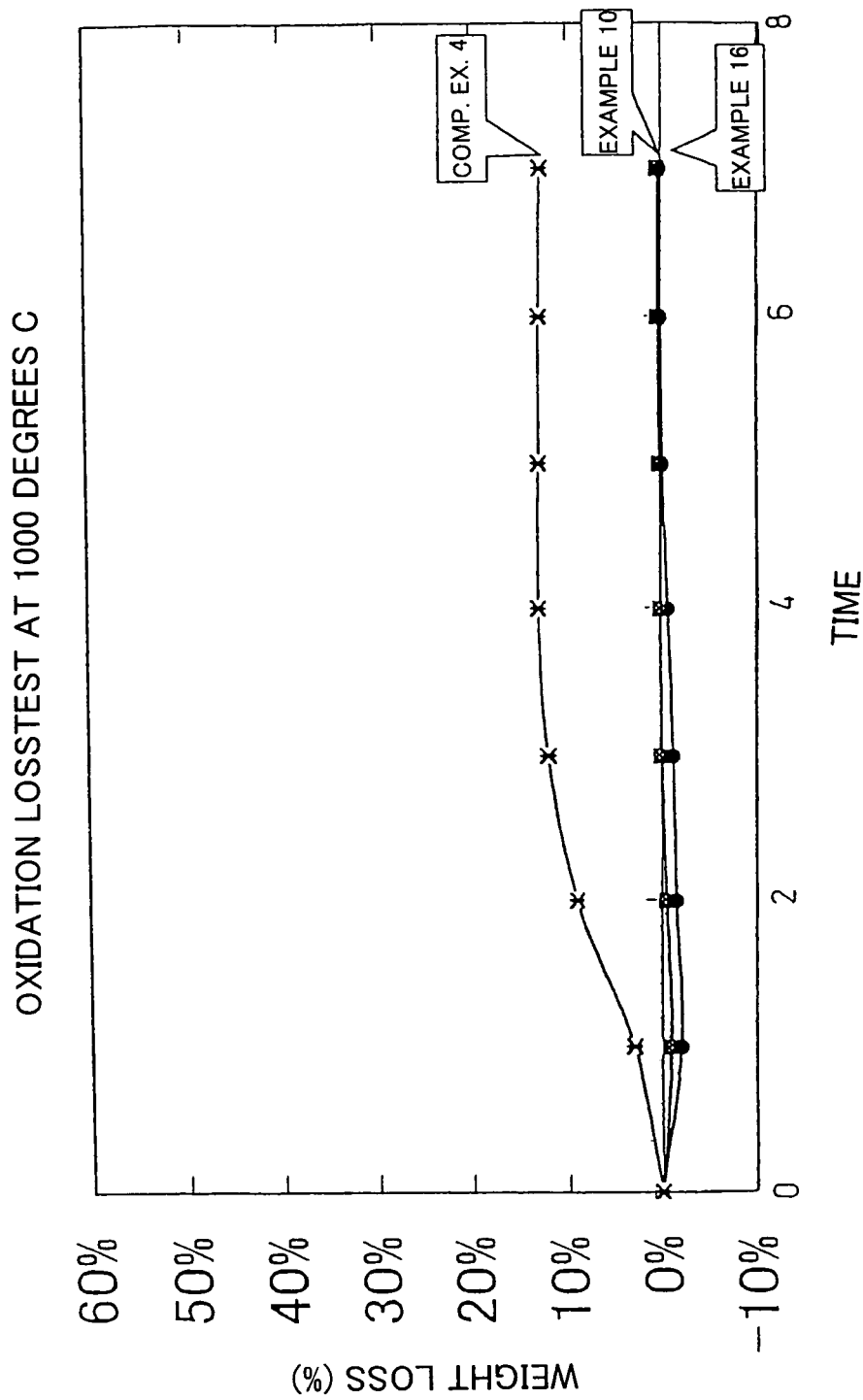
FIG. 4 is a graph showing weight loss due to oxidation at 1000 degrees C. in the atmosphere with respect to Examples 10 and 16, and Comparative Example 4 of the present invention.

As shown in FIG. 4, at 1000 degrees C., the materials of Examples 10 and 16 that contain the boron carbide powder and the silicon carbide powder exhibited no weight loss, and oxidation loss thereof were almost completely suppressed even at 1000 degrees C. In Comparative Example 4, weight loss arose at an initial stage.

Figure 5:
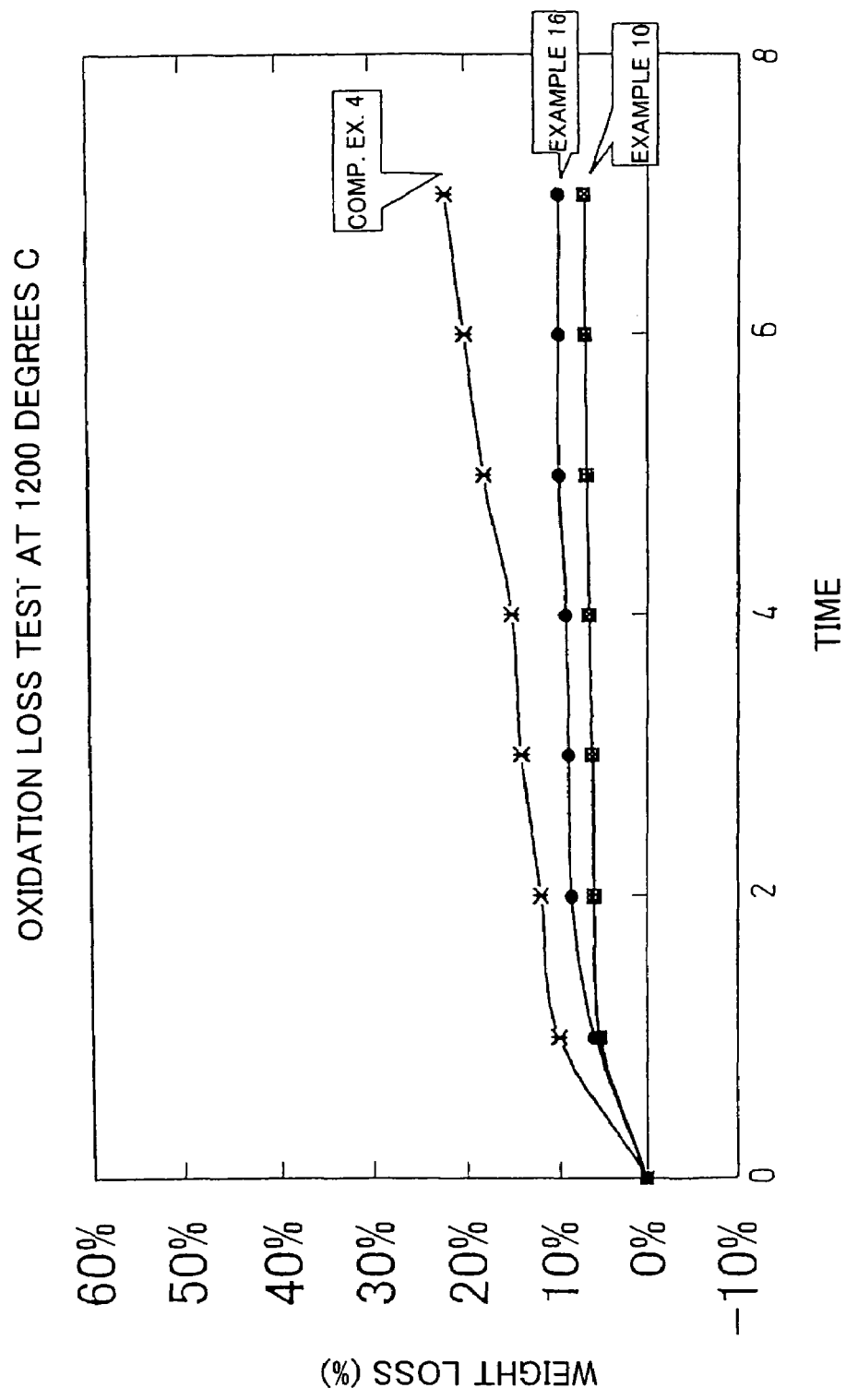
FIG. 5 is a graph showing weight loss due to oxidation at 1200 degrees C. in the atmosphere with respect to Examples 10 and 16, and Comparative Example 4 of the present invention.

As shown in FIG. 5, at 1200 degrees C., the materials of Examples 10 and 16 that contain the boron carbide powder and the silicon carbide powder exhibited weight loss at initial stages of oxidation loss, and, thereafter, hardly exhibited further weight loss. Comparative Example 4 exhibited monotonous weight loss over time.

Figure 6:
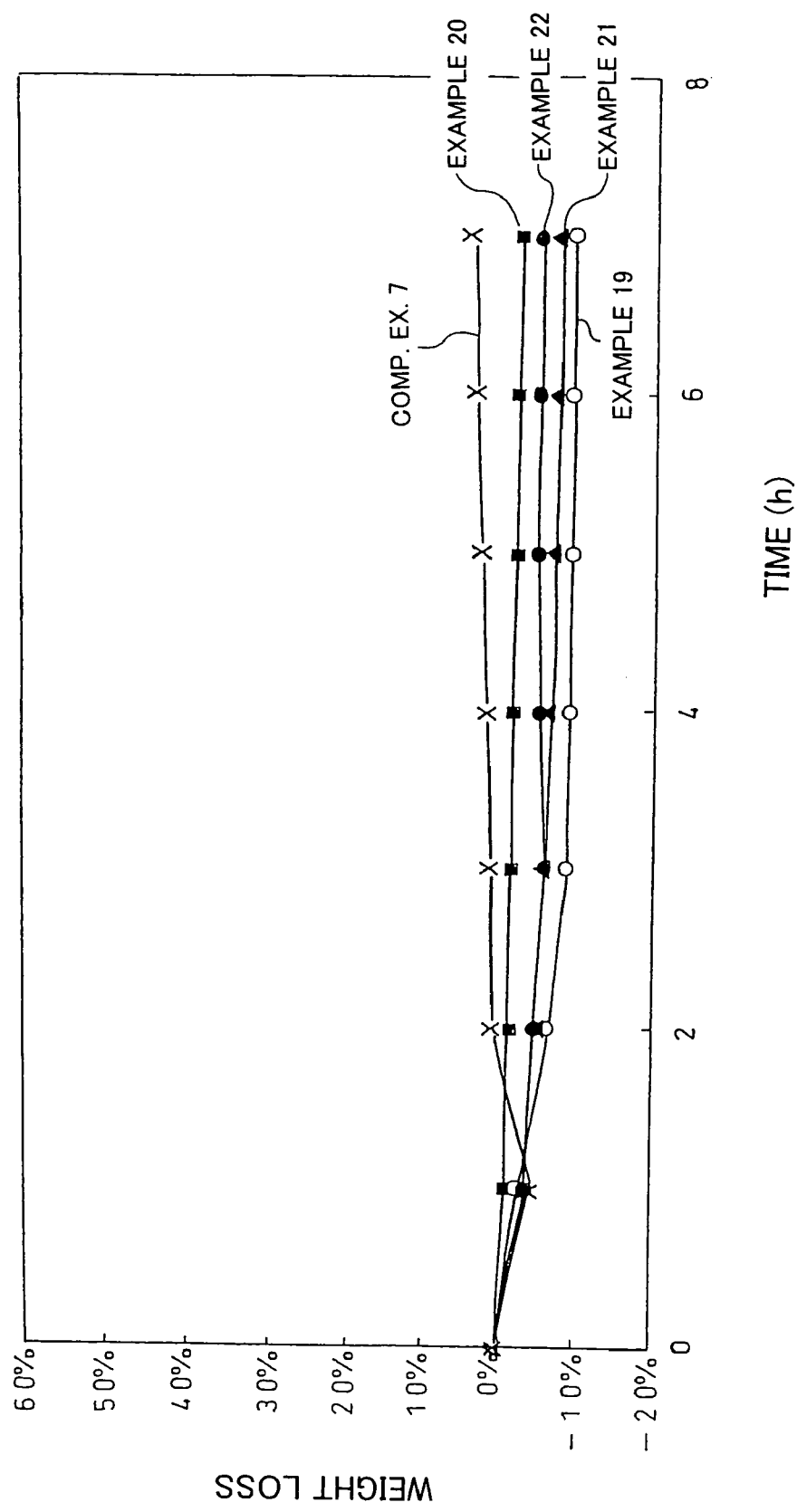
FIG. 6 is a graph showing weight loss due to oxidation at 800 degrees C. in the atmosphere with respect to Examples 19, 20, 21 and 22, and Comparative Example 7 of the present invention.

FIG. 6 shows variations in weight loss of Examples 19 to 22 and Comparative Example 7 due to oxidation loss at 800 degrees C. as plotted against lapse of time. As shown in FIG. 6, at 800 degrees C., any Example exhibited a little weight increase at an initial stage of oxidation loss. No weight loss was exhibited, and oxidation loss was substantially suppressed. It can be seen from Comparative Example 7 that, when the amount of boron carbide was less than 32 volume % based on the volume of the carbon fibers, weight loss due to oxidation loss occurred little by little.

As described above, according to the oxidation resistant C/C composites of the present invention which contain, among the ceramic powders, only the boron carbide powder, weight loss due to oxidation was completely suppressed at 800 degrees C. At 900 degrees C. as well, weight loss due to oxidation could extremely be reduced. According to the oxidation resistant C/C composites of the present invention which contain, among the ceramic powders, both the boron carbide powder and the silicon carbide powder, weight loss due to oxidation was completely suppressed up to 1000 degrees C. At 1200 degrees C., although weight loss of not more than 10% occurred at the initial stage, further weight loss was suppressed thereafter. Accordingly, they can be adopted as an oxidation-resistant material up to 1200 degrees C.

INDUSTRIAL APPLICABILITY

There can be produced through a simple process an oxidation resistant C/C composite that suffers from substantially no oxidation loss at 800 degrees C. in the atmosphere and has excellent mechanical characteristics such as high toughness etc.

The invention claimed is:

1. An oxidation resistant carbon fiber reinforced carbon composite material comprising two or more layers of cloth-form or sheet-form carbon fibers adhered with a matrix, wherein the matrix comprises a ceramic powder and is uniformly distributed on the cloth-form or sheet-form carbon fibers,
   wherein
   the ceramic powder comprises a boron carbide powder having an average particle diameter of 5 μm or less; and an amount of the ceramic powder is 32 volume % or more based on volume of the carbon fibers, and
   wherein the composite material comprises 20 volume % or more of said cloth-form or sheet-form carbon fibers.

2. The oxidation resistant carbon fiber reinforced carbon composite material according to claim 1, wherein the carbon fibers comprise at least one selected from the group consisting of a fine-woven spun-yarn cloth; a two-dimensional-woven cloth of continuous threads of long carbon fibers; a one-dimensional long carbon fiber sheet; short carbon fibers and a fine-woven spun-yarn cloth; short carbon fibers and a two-dimensional-woven cloth of continuous threads of long carbon fibers; and short carbon fibers and a one-dimensional long carbon fiber sheet.

3. The oxidation resistant carbon fiber reinforced carbon composite material according to claim 1, wherein the ceramic powder consists of said boron carbide powder.

4. The oxidation resistant carbon fiber reinforced carbon composite material according to claim 1, wherein the ceramic powder comprises the boron carbide powder and a silicon carbide powder.

5. The oxidation resistant carbon fiber reinforced carbon composite material according to claim 1, wherein the matrix comprises a liquid synthetic resin or a liquid synthetic resin and a powdery synthetic resin uniformly mixed with the ceramic powder.

6. The oxidation resistant carbon fiber reinforced carbon composite material according to claim 5, wherein the matrix comprises mesocarbon microbeads and/or a carbon powder having 5 to 15 weight % of a residual volatile matter.

7. The oxidation resistant carbon fiber reinforced carbon composite material according to claim 1, wherein the cloth-form or sheet-form carbon fibers are further impregnated with a pitch or a synthetic resin to be carbonized.

8. A process for producing an oxidation resistant carbon fiber reinforced carbon composite material comprising two or more layers of cloth-form or sheet-form carbon fibers adhered with a matrix, wherein the matrix comprises a ceramic powder and is uniformly distributed on the cloth-form or sheet-form carbon fibers, wherein the composite material comprises 20 volume % or more of said cloth-form or sheet-form carbon fibers, the method comprising:
   uniformly applying a slurried matrix precursor formed by mixing a liquid synthetic resin with the ceramic powder that comprises, based on volume of the carbon fibers, 32 volume % or more of a boron carbide powder having an average particle diameter of 5 μm or less to the cloth-form or sheet-form carbon fibers, and
   putting in layers and baking the cloth-form or sheet-form carbon fibers.

9. The process for producing an oxidation resistant carbon fiber reinforced carbon composite material according to claim 8, comprising uniformly infiltrating the matrix precursor into cloth-form or sheet-form carbon fibers, further, uniformly applying to surfaces of the carbon fibers, and subsequently putting in layers and baking the cloth-form or sheet-form carbon fibers put in layers and baked.

10. The process for producing an oxidation resistant carbon fiber reinforced carbon composite material according to claim 8, comprising uniformly applying the matrix precursor to the cloth-form or sheet-form carbon fibers, putting in layers and baking the cloth-form or sheet-form carbon fibers, and further impregnating the cloth-form or sheet-form carbon fibers with pitch or synthetic resin to be carbonized.

11. The process for producing an oxidation resistant carbon fiber reinforced carbon composite material according to claim 8, wherein the matrix precursor has a viscosity of 5 to 40 mPa·s.

12. The process for producing an oxidation resistant carbon fiber reinforced carbon composite material according to claim 8, comprising adding to the matrix precursor any one or more among mesocarbon microbeads, carbon powder including 5 to 15 weight % of residual volatile matter, and short carbon fibers.

13. The oxidation resistant carbon fiber reinforced carbon composite material according to claim 1, wherein the uniformly distributed matrix impregnates the cloth-form or sheet-form carbon fibers.

* * * * *